United States Patent [19]
Heid

[11] 3,735,780
[45] May 29, 1973

[54] VALVE
[75] Inventor: Walter Heid, 8770 Lohr/Main, Germany
[73] Assignee: Rexroth GmbH, Lohr/Main, Germany
[22] Filed: July 23, 1971
[21] Appl. No.: 165,649

[30] Foreign Application Priority Data
July 31, 1970   Germany..................P 20 38 115.1

[52] U.S. Cl. ........................................137/625.69
[51] Int. Cl. ...............................................F16k 4/00
[58] Field of Search..............137/625.69, 625.67, 137/625.62; 251/205

[56] References Cited
UNITED STATES PATENTS

| | | |
|---|---|---|
| 3,174,510 | 3/1965 | Nelson ..........................137/625.69 |
| 3,198,212 | 8/1965 | Junck et al. ................137/625.69 X |
| 3,460,577 | 8/1969 | Weathers ......................137/625.69 |
| 3,543,648 | 12/1970 | Stahle..........................137/625.62 X |

Primary Examiner—Henry T. Klinksiek
Assistant Examiner—Robert J. Miller
Attorney—Michael S. Striker

[57] ABSTRACT

A housing of a valve has an internal elongated chamber provided with a plurality of longitudinally arrayed discrete annular spaces including two longitudinally spaced terminal ones each of which communicate with a port. An elongated valve member is received in and longitudinally slidable in this chamber and provided with a plurality of spaced annular recesses in its outer circumferential surface. Each of these recesses is bounded by longitudinally spaced flow control edges. At least one annular groove is also provided axially adjacent at least one of the annular edges of each pair in the valve member.

5 Claims, 3 Drawing Figures

VALVE

BACKGROUND OF THE INVENTION

The present invention relates generally to a valve, and more particularly to a flow control valve, especially for controlling the flow of hydraulic fluids.

It is already known to provide valves of this general type here under discussion, wherein an elongated valve member is slidable in a chamber of a valve housing and is provided with circumferential recesses which when the valve member is in appropriate position, will connect adjacent valve spaces with one another so that the working fluid can pass from the valve space having a higher pressure into the valve space which is at a lower pressure. The pressure loss of the hydraulic fluid which results during the flow thereof in the valve, is a characteristic which is essential for the utilization of such valves in hydraulic systems. Therefore, a certain throughput in a given hydraulic system requires the selection of the valve of such a size, that economic operation is assured despite pressure losses which result at this throughput.

It is known, to reduce the flow resistance in such valves which causes the pressure loss, to provide the valve spaces surrounding the valve member of relatively liberal dimension, and to configurate the recesses in the valve member which would be adjacent valve spaces to provide flow passages for the fluid, so that they are hydrodynamically advantageous. The improvements obtained, particularly in terms of reducing the flow resistance, have however been slight and therefore are of insignificant economic importance. Better results for reducing the flow resistance were obtained by providing guide baffles which were formed in the valve spaces surrounding the valve member, and which were found to equalize the flow of fluid over the entire circumference of the valve member and therefore in the passages controlled by the same. This measure significantly reduces flow resistance, so that for certain flow schemes of the valve the next smaller valve size can be utilized (compared to the prior art) with the same flowthrough quantity. However, it will be appreciated that the possible provision of such baffles, usually separate elements which must be cast when the valve housing is cast, requires additional time and work so that the valve becomes correspondingly more expensive and complicated.

SUMMARY OF THE INVENTION

It is, accordingly, a general object of the present invention to provide an improved valve of the type under discussion.

More particularly it is an object of the present invention to provide such an improved valve which is very simple in its construction and requires no increased technological expenditure over what is known from the prior art, but which does afford reduced flow resistance which is comparable in its reduction with that obtained by the use of guide baffles.

In pursuance of the above objects, and of others which will become apparent hereafter, one feature of the invention recites in a valve, particularly for guiding hydraulic fluids, which comprises a housing having an internal elongated chamber provided with a plurality of longitudinally arrayed discrete annular spaces including two longitudinally spaced terminal ones each of which communicates with a port of which one is an inlet and the other an outlet. An elongated valve member is received and longitudinally slidable in the chamber and has an outer circumferential surface provided with a plurality of spaced annular recesses each of which is bounded by a pair of longitudinally spaced annular edges. At least one annular groove is provided axially adjacent at least one of the annular edges of each pair.

Each such groove provides for a significant flow division in the flowing fluid, and because of the second flow path provided by the respective groove the fluid is particularly to that side of the respectively connected annular valve spaces which faces away from the inlet port, so that a largely equalized flow speed —reducing the flow resistance— is obtained in the annular flow path. Particularly if the valve member is produced on automatic machines, the formation of these grooves requires only minimal additional work which hardly influences the expenses involved in producing the valve. The configuration and production of the valve housing itself is not involved at all, so that the valve housing itself does not become more expensive to produce and that an existing valve housing can be utilized in conjunction with a valve member in accordance with the present invention.

A particularly advantageous flow division or distribution is achieved in that the depth of the groove corresponds at least approximately to the depth of the annular recesses in the valve member. If the structural strength of the valve member so permits, the grooves may actually be deeper than the annular recesses.

To further reduce the flow resistance it is advantageous to so arrange the respective grooves that in the switching or operative position of the valve member, the radial edge face bounding the respective grooves which is remote from the annular edge, is at least substantially flush with that annular edge of the valve space which is remote from the opened flow path. An optimal cross-sectional configuration of the groove or grooves —with a view towards the desired reduction of the flow resistance— can be achieved in that the elongation of the grooves in axial direction of the valve member corresponds at least approximately to the axial elongation of the annular rib remaining between the groove and the associated proximal radial edge.

The novel features which are considered as characteristic for the invention are set forth in particular in the appended claims. The invention itself, however, both as to its construction and its method of operation, together with additional objects and advantages, will be best understood from the following description of specific embodiments when read in connection with the accompanying drawing.

DESCRIPTION OF THE PREFERRED EMBODIMENTS

Figure 2:
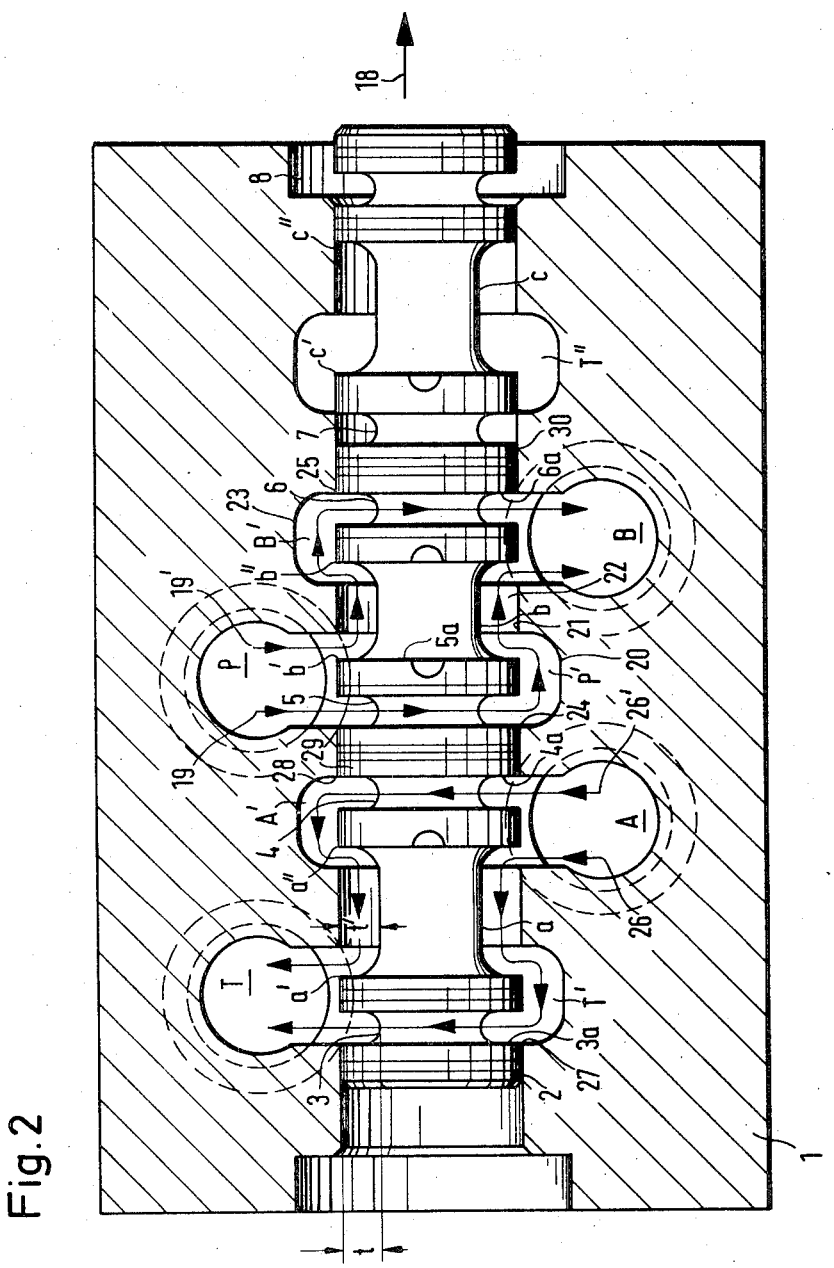
FIG. 2 is a view similar to FIG. 1, taken on a line in a plane normal to the plane of FIG. 1 and showing the valve member in one switching position.
Figure 3:
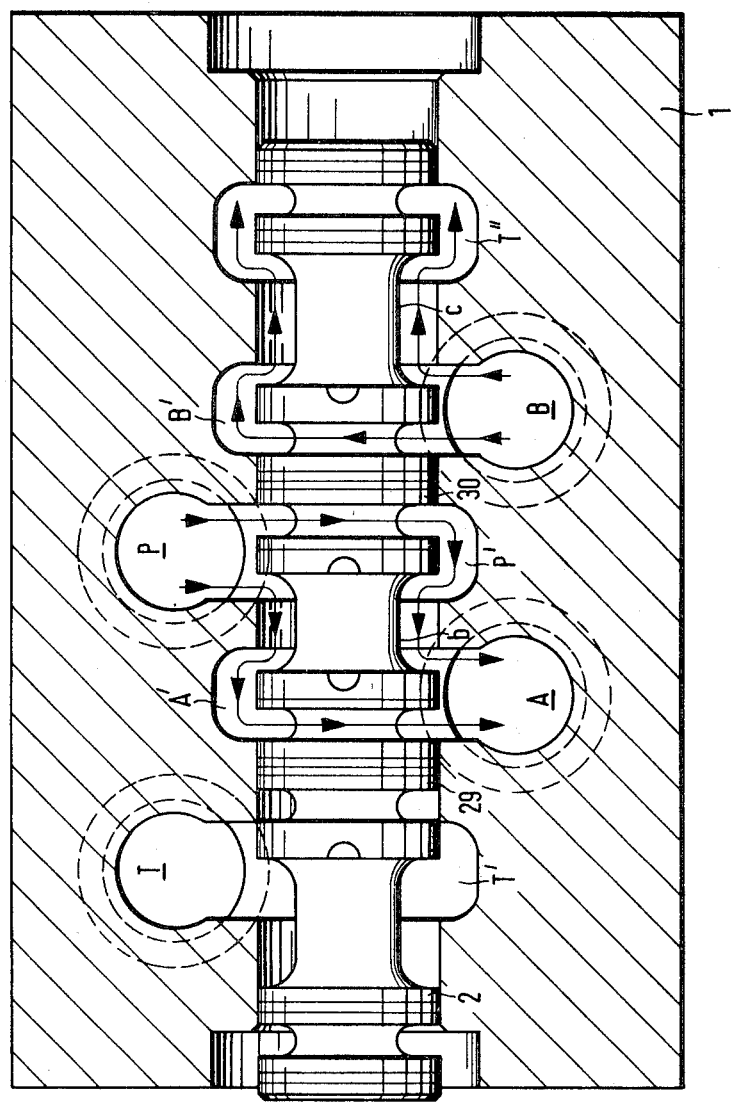
FIG. 3 is a view similar to FIG. 2 but illustrating the valve member in the other switching position.

Discussing now the drawing in detail it will be seen that in all of the three Figures the valve housing is identified in toto with reference numeral 1, whereas the piston or valve member is identified with reference numeral 2. The valve housing has a port or pump connection P, another port or tank connection T and the working conduit connections A and B, as shown in FIGS. 2 and 3. These various connections communicate with annular valve spaces T', A', P', B' and T'' which are provided in the inner circumferential surface of the chamber provided in the valve housing 1 and which annularly surround the valve member 2 which is slidably accommodated in this chamber.

The valve member 2 itself is provided with circumferential or annular recesses $a$, $b$ and $c$ which are axially spaced and which, when the valve member is in appropriate switching position (see FIGS. 2 and 3) connect adjacent valve spaces with one another by bridging them and communicating both of them. In the vicinity of the radial edges $a'$, $a''$, $b'$, $b''$, $c'$, $c''$, which bound the respective recesses $a$, $b$ and $c$, there are provided grooves 3, 4, 5, 6, 7 and 8 which are annular and which serve for dividing the flow of fluid. The depth of these grooves is identified with reference numeral $t$ and corresponds at least substantially to the depth $t'$ of the circumferential recesses $a$, $b$, and $c$. The longitudinal extension of the grooves, that is their extension in axial direction of the valve member 2, is identified with reference numeral 1 and corresponds approximately to the same dimension $1'$ of the remaining ribs 9, 10, 11, 12, 13 and 14. The edges $a''$, $b'$, $b''$ and $c'$ also serve as the control edges of the valve member.

Figure 1:
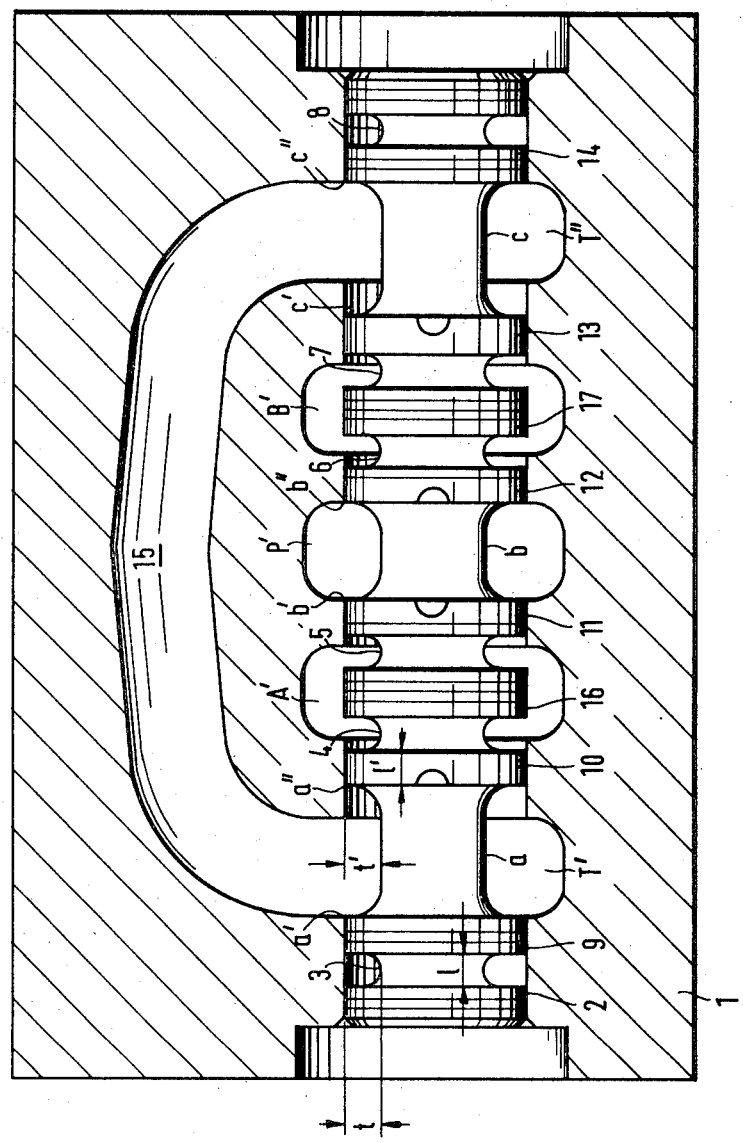
FIG. 1 is a somewhat diagrammatic axial section through a four-way valve according to the present invention, in starting position.

The valve member is shown in FIG. 1 in its starting or normal position in which the valve spaces are fluid-tightly separated from one another by the ribs 10, 11, 12 and 13. Only the valve space T'' is connected via a channel 15 with the valve space T' which in turn communicates with the tank port T. Of course, the channel 15 can be omitted and in its place the valve space T'' can be directly connected by a suitable port with the tank.

The ribs 16 and 17 resulting from the position from the respectively associated grooves are located in the region of the valve spaces A' and B' and fulfill the particular function in this position of the valve member.

When the valve member 2 has been shifted in the direction of the arrow 18 with respect to its position shown in FIG. 1, as illustrated in FIG. 2, the recess $a$ of the valve member 2 connects the valve space T' with the valve space A', whereas the recess $b$ connects the valve space T' with the valve space B'. This means that the port A for the working conduit is connected with the tank and the port B for another working conduit is connected with the pump. As a result, a flow of fluid takes place from the valve space T' into the valve space B', and a flow further takes place from the valve space A' back into the valve space T'. The grooves 5 and 6 in the region of the edges $b'$ and $b''$ thus each provide for an additional flow path in the valve spaces P' and B', so that two partial flows identified by the arrows 19 and 19' take place from the pump port P to the working conduit port B. The second flow path identified by the arrow 19 and caused by the groove 5, permits the flow of additional fluid to that side 20 of the valve space P' which is opposite the pump port P, so that in the annular space 22 between the bore 21 and the recess $b$ there prevails a largely equalized flow speed.

The second flow path provided by the groove 6 in the valve space B' assures that the fluid flowing into the region 23 opposite the working conduit port B, will have the opportunity to flow freely in the direction of the port B. The radial edge face 5a of the groove 5 which is remote from the edge $b'$, and the radial edge face 6a of the groove 6 which is remote from the edge $b'$, are flush with the edges 24 and 25 of the valve spaces P' and B', respectively, so that the flow paths defined by the grooves 5 and 6 are largely free of loss. The same flow conditions exist between the port A and the port T. The groove 4 defines a further flow path in the valve space A', so that the fluid arriving from the port A is subdivided according to the arrows 26 and 26' into two partial flows which are maintained even in the valve space T' by virtue of the presence of the grooves 3. The radially outwardly extending edge face 4a of the groove 4, as well as the corresponding edge face 3a of the groove 3 are also flush with the edges 27 and 28, respectively of the valve spaces T' and A' in order to obtain in this region a largely loss-free flow of fluid. The grooves 3 and 8 which operate in the valve spaces T' and T'' which are in communication with the port T, provide —generally speaking— only small improvements in the flow resistance, so that they can be omitted if only small demands are made in terms of desirable improvements in the flow resistance. The ribs 29 and 30 provided by the presence of the grooves 4, 5, 6 and 7, fluid-tightly close the valve spaces P' and A', as well as the valve spaces B' and T' from one another in this position of the valve member 2.

In the opposite working or switching position of the valve member 2, as shown in FIG. 3, the valve space P' is connected with the valve space A' via the recess $b$, and the valve space B' is connected with the valve space T'' via the recess $c$. The valve spaces P' and B' and the valve spaces A' and T' are separated fluid-tightly from one another by the ridges 29 and 30. In this switching position the flow conditions with respect to the division of streams and the thereby achieved reduction of flow losses are the same as in the position shown in FIG. 2.

It will be appreciated, of course, that the invention has only been illustrated and described by way of example in FIGS. 1–3, and that other possibilities exist and will offer themselves to those skilled in the art. In particular, it is possible to utilize a hollow valve member instead of the solid-cross section valve member which was illustrated. Also, the illustrated flow picture is by no means mandatory. Furthermore, the ribs which exist as a result of the provision of the grooves can also be configurated in advantageous manner as disk-shaped ribs which advantageously influence the flow of the fluid, if the ribs are not simultaneously intended to provide for a sealing function with respect to adjacent valve spaces, as in the case in the illustrated embodiment.

It will be understood that each of the elements described above, or two or more together, may also find a useful application in other types of constructions differing from the types described above.

While the invention has been illustrated and described as embodied in a valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A valve, particularly for hydraulic fluids, comprising a housing having an internal elongated chamber provided with a plurality of longitudinally arrayed discrete annular spaces including two longitudinally spaced terminal ones each of which communicates with a port; an elongated valve member received and longitudinally slidable in said chamber, said valve member having an outer circumferential surface provided with a plurality of spaced annular recesses each of which is bounded by a pair of longitudinally spaced annular edges; and at least one annular groove axially adjacent at least one of said annular edges of each pair and having a depth which corresponds at least substantially to the depth of said annular recesses.

2. A valve as defined in claim 1, wherein each of said grooves has two radial edge faces one of which is further from the associated annular recess than the other, and wherein said valve member is movable to and from a position in which each of said annular recesses bridges and connects into a composite space two consecutive ones of said annular spaces and in which said one radial edge face of the respective groove is substantially flush with an annular edge bounding the composite space.

3 A valve as defined in claim 1, wherein each of said grooves has an axial length corresponding at least substantially to the distance of the respective groove from the axially adjacent annular edge.

4. A valve as defined in claim 1, wherein said valve member is provided with ribs located between the respective grooves and the respectively axially adjacent annular edges.

5. A valve as defined in claim 4, wherein said ribs are annular ribs of hydrodynamically advantageous configuration.

* * * * *